United States Patent
Ha et al.

(10) Patent No.: US 10,643,109 B2
(45) Date of Patent: May 5, 2020

(54) METHOD AND SYSTEM FOR AUTOMATICALLY CLASSIFYING DATA EXPRESSED BY A PLURALITY OF FACTORS WITH VALUES OF TEXT WORD AND SYMBOL SEQUENCE BY USING DEEP LEARNING

(71) Applicant: NAVER Corporation, Seongnam-si (KR)

(72) Inventors: Jung Woo Ha, Seongnam-si (KR); Hyuna Pyo, Seongnam-si (KR); Jeong Hee Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 106 days.

(21) Appl. No.: 15/943,279

(22) Filed: Apr. 2, 2018

(65) Prior Publication Data

US 2018/0225553 A1 Aug. 9, 2018

Related U.S. Application Data

(63) Continuation of application No. PCT/KR2016/010912, filed on Sep. 29, 2016.

(30) Foreign Application Priority Data

Oct. 2, 2015 (KR) .......................... 10-2015-0139192

(51) Int. Cl.
*G06K 9/62* (2006.01)
*G06N 3/04* (2006.01)
(Continued)

(52) U.S. Cl.
CPC .......... *G06K 9/6277* (2013.01); *G06F 16/355* (2019.01); *G06F 40/20* (2020.01);
(Continued)

(58) Field of Classification Search
CPC combination set(s) only.
See application file for complete search history.

(56) References Cited

U.S. PATENT DOCUMENTS

| 8,527,276 B1 * | 9/2013 | Senior | G06N 3/084 |
| | | | 704/259 |
| 8,699,796 B1 * | 4/2014 | Diao | G06K 9/00865 |
| | | | 382/181 |

(Continued)

FOREIGN PATENT DOCUMENTS

| KR | 1020040021789 A | 3/2004 |
| WO | 2011117593 A1 | 9/2011 |

OTHER PUBLICATIONS

ISR issued in Int'l. App. No. PCT/KR2016/010912, dated Jan. 9, 2017.

*Primary Examiner* — Tsung Yin Tsai
(74) *Attorney, Agent, or Firm* — Greer Burns & Crain Ltd.

(57) ABSTRACT

Disclosed are a method and a system for automatically classifying data expressed as a plurality of factors with values of a text word and a symbol sequence by using deep learning. The method comprises the steps of: inputting the data expressed by the plurality of factors so as to express a word vector including sequence information of the factors through sequence learning of words corresponding to the factors with respect to each factor constituting the data in a first model; inputting an output of the first model so as to calculate points of each category for classifying the categories of the data by using the word vector including the sequence information of the factor in a second model; and determining at least one category for the data by using the points of each category.

15 Claims, 8 Drawing Sheets

(51) Int. Cl.
  *G06Q 30/02* (2012.01)
  *G06F 16/35* (2019.01)
  *G06Q 10/06* (2012.01)
  *G06F 40/20* (2020.01)
  *G06F 40/258* (2020.01)
  *G06N 3/08* (2006.01)
  *G06N 5/04* (2006.01)

(52) U.S. Cl.
  CPC ......... *G06F 40/258* (2020.01); *G06K 9/6269* (2013.01); *G06K 9/6274* (2013.01); *G06K 9/6276* (2013.01); *G06N 3/0445* (2013.01); *G06N 3/0454* (2013.01); *G06N 3/08* (2013.01); *G06N 5/046* (2013.01); *G06Q 10/067* (2013.01); *G06Q 30/0201* (2013.01); *G06Q 30/0282* (2013.01)

(56) References Cited

U.S. PATENT DOCUMENTS

| | | | |
|---|---|---|---|
| 2012/0066220 A1 | 3/2012 | Alspector et al. | |
| 2012/0078834 A1 | 3/2012 | Sainath et al. | |
| 2015/0095017 A1 | 4/2015 | Mnih et al. | |
| 2015/0220833 A1* | 8/2015 | Le | G06N 3/084 706/16 |
| 2017/0213130 A1* | 7/2017 | Khatri | G06F 16/345 |
| 2017/0286401 A1* | 10/2017 | He | G06F 40/30 |
| 2018/0032663 A1* | 2/2018 | Yoo | G06N 5/04 |
| 2018/0225553 A1* | 8/2018 | Ha | G06F 16/355 |

\* cited by examiner

METHOD AND SYSTEM FOR AUTOMATICALLY CLASSIFYING DATA EXPRESSED BY A PLURALITY OF FACTORS WITH VALUES OF TEXT WORD AND SYMBOL SEQUENCE BY USING DEEP LEARNING

CROSS-REFERENCE TO RELATED APPLICATIONS

This is a continuation application of International Application No. PCT/KR2016/010912, filed Sep. 29, 2016, which claims benefit of Korean Patent Application No. 10-2015-0139192, filed Oct. 2, 2015.

FIELD OF INVENTION

Example embodiments of the present invention relate to a deep learning model and a learning algorithm technique for automatically classifying data when the data includes a plurality of factors having a sequence of symbols or text words as a value.

DESCRIPTION OF RELATED ART

With the increase in the Internet use, distributions and sales of products and services using Internet shopping malls are active. In addition, opportunities for mobile business using smartphones, etc., are currently being expanded and the mobile shopping markets are also on the rapid increase.

Accordingly, as the number of Internet shopping malls are exponentially increasing, each Internet shopping mall employs a mall-in-mall operation scheme to enhance the user convenience in accessibility. Such a mall-in-mall scheme allows a user to access each Internet shopping mall through a desired intermediary shopping mall.

In general, in a shopping system that operates a shopping service, such as an intermediary shopping mall, a purchaser needs to search for desired product information. Accordingly, the search system provides a search environment so that the purchaser may easily search for product information on sales through a site.

The shopping system classifies and thereby stores product information using various categories and enables a user to search for desired information through a category-based search. A technique for automatically classifying a product category is very important in terms of services. Many shopping systems currently have an automatic product category classification system.

For example, a technique for automatically registering product information using an appropriate product name and category by comparing and matching product information received from a plurality of shopping malls to products registered to a product information providing server is disclosed in Korean Patent Publication No. 10-2004-0021789, published on Mar. 11, 2004, titled a "method and system for registering product information".

However, as a number of products registered and handled over time exponentially increases, the performance of the automatic classification system being currently used is degraded and the accuracy of category classification may not be guaranteed.

Deep learning exhibits relatively high accuracy compared to existing classification models, such as a support vector machine (SVM), a Bayesian network (BN), a decision tree (DT), a k-th nearest neighbor (kNN), etc., regarding various classification issues occurring in terms of an image, a voice recognition, a pattern recognition, and the like. In particular, regarding an issue of classifying data expressed in a text sequence format, a convolutional neural network (CNN), a recursive neural network, a recurrent neural network (RNN), etc., exhibit relatively excellent performance compared to existing TF/IDF-based bag of words or n-gram based models. However, according to the increase in the length of a text sequence, the performance may be degraded. When data includes a plurality of factor parameters and is expressed by a sequence of text words of each factor parameter, and in this instance, the data is combined into a single word sequence and thereby input to a model, the classification performance may be deteriorated due to an increase in ambiguity of meaning and sequence length. For example, product information data of an online shopping mall is expressed as a variety of text information, such as a product name, a shopping mall name, product category information, a brand name, a manufacturer name, and the like. However, if they are combined into a single word sequence, the meaning may become ambiguous.

One or more example embodiments provide a new automatic product category classifier using a deep learning scheme to outperform the performance limit found in an existing automatic product category classifier using a Bayesian network (BN) or a decision tree (DT) scheme.

One or more example embodiments also provide a new deep learning model-based automatic classifier using a feed-forward neural network (FFNN) of allocating a recurrent neural network (RNN) for each of the factors constituting data and using output values of a plurality of RNNs as input values for classification, to outperform the limit found in an existing deep learning model of performing learning after combining data expressed by a plurality of factors into a single word/symbol sequence.

According to an aspect of at least one example embodiment, there is provided a computer-implemented method including using, as an input, data expressed by a plurality of factors, and expressing a word vector including sequence information of a factor through a sequence learning of a word corresponding to the factor with respect to each of the factors constituting the data in a first model; using, as an input, an output of the first model, and calculating points for each category for classifying a category of the data using the word vector included in the sequence information of the factor in a second model; and determining at least one category for the data based on the points for each category.

According to an aspect of at least one example embodiment, there is provided a system of a server including at least one processor. The at least one processor includes a learning processor configured to provide a learning model for classifying a category of data expressed by a plurality of factors; and a category classifier configured to classify the category of the data based on a learning result of the learning model, and the learning processor is configured to use the data as an input, and to express a word vector including sequence information of a factor through a sequence learning of a word corresponding to the factor with respect to each of the factors constituting the data in a first model, and to use, as an input, an output of the first model, and to calculate points for each category for classifying a category of the data using the word vector included in the sequence information of the factor in a second model, and the category classifier is configured to determine at least one category for the data based on the points for each category.

According to some example embodiments, there is provided a new automatic product category classifier using a deep learning scheme to outperform the performance limit found in an existing automatic product category classifier using a Bayesian network (BN) or a decision tree (DT) scheme. Accordingly, through the enhancement in the performance of automatic product category classification, it is possible to reduce cost used for the category classification and to increase the accuracy of the category classification. In addition, it is possible to enhance a satisfaction level on both a seller that registers a product and a purchaser that searches for and/or purchases a product.

According to some example embodiments, there is provided a new automatic text/symbol sequence data classifier in which a plurality of recurrent neural networks (RNNs) and a feedforward neural network (FFNN) are combined to outperform the limit, that is, a degradation in the performance, found in existing deep learning models using a single RNN or convolutional neural network (CNN), occurring when a sequence of symbols or words increases or data includes a plurality of factors. Accordingly, it is possible to achieve the enhancement in quality of service (QoS) by applying the enhanced automatic classification model to various domain issues. For example, through the enhancement in the classification accuracy achieved by applying to an issue of automatically classifying detailed categories from product metadata, it is possible to enhance a satisfaction level on both a seller that registers a product and a purchaser that searches for and/or purchases a product. Through automatic classification of online news articles into detailed sections, it is possible to enhance a satisfaction level of an online news reader. Also, applying to a classification of user comments on movies, news, blogs, products, and the like, into like/dislike, it is possible to enhance the accuracy of content recommendation.

DETAILED DESCRIPTION OF THE INVENTION

Hereinafter, example embodiments are described with reference to the accompanying drawings.

The example embodiments relate to a technique for automatically classifying data expressed by a plurality of factors, and particularly, provide a new deep learning model based automatic classifier using a feedforward neural network (FFNN) of allocating a recurrent neural network (RNN) for each of the factors and using output values of a plurality of RNNs as input values for classification.

The expression "data expressed by a plurality of factors" used herein indicates data including at least one factor having a sequence of text words or symbols as a value, and may correspond to, for example, product information, or content, such as a movie, news, blog posting, etc. Hereinafter, using product information as a representative example of "data expressed by a plurality of factors", the example embodiments of automatically classifying a product category from product information metadata will be described.

Figure 1:
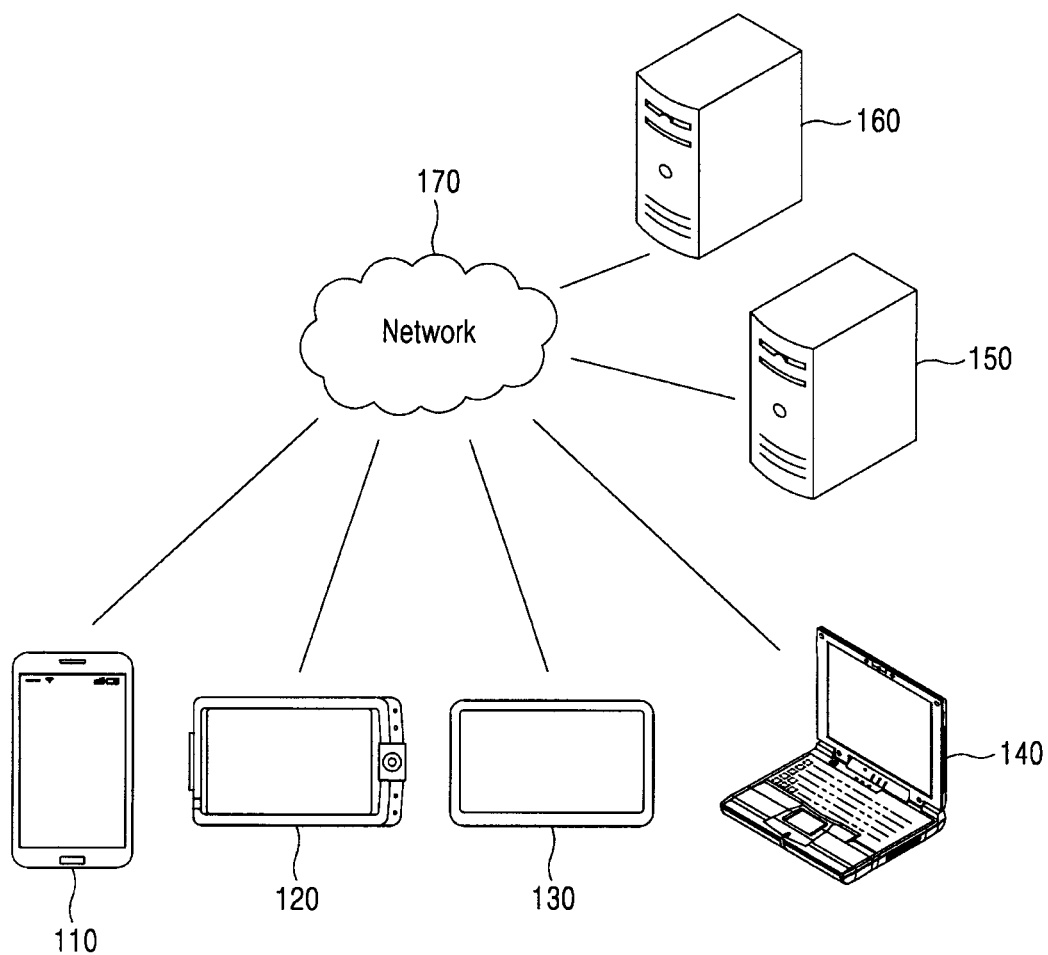
FIG. 1 is a diagram illustrating an example of a network environment according to one embodiment.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto.

Each of the plurality of electronic devices 110, 120, 130, and 140 may be a fixed terminal or a mobile device. For example, the plurality of electronic devices 110, 120, 130, 140 may be a smartphone, a mobile phone, a navigation device, a computer, a laptop computer, a digital broadcasting terminal, a personal digital assistant (PDA), a portable multimedia player (PMP), a tablet personal computer (PC), and the like. For example, the electronic device 110 may communicate with other electronic devices 120, 130, 140, and/or the servers 150, 160 over the network 170 in a wired communication manner or in a wireless communication manner.

The communication scheme is not particularly limited and may include a communication method that uses a near field communication between devices as well as a communication method using a communication network, for example, a mobile communication network, the wireless Internet, a broadcasting network, etc., which may be included in the network 170. For example, the network 170 may include at least one of network topologies such as, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, these networks are only examples and the example embodiments are not limited thereto.

Each of the servers 150 and 160 may be configured as a computer apparatus or a plurality of computer apparatuses that provides instructions, codes, files, contents, services, and the like, through communication with the plurality of electronic devices 110, 120, 130, 140 over the network 170.

For example, the server 160 may provide a file for installing an application to the electronic device 110 connected through the network 170. In this case, the electronic device 110 may install the application using the file provided from the server 160. Also, the electronic device 110 may access the server 150 under control of at least one program, for example, browser or the installed application, or an operating system (OS) included in the electronic device 110, and may use a service or content provided from the server 150. For example, when the electronic device 110 transmits a service request message to the server 150 through the network 170 under control of the application, the server 150 may transmit a code corresponding to the service request message to the electronic device 110 and the electronic device 110 may provide content to a user by configuring and displaying a screen according to the code under control of the application.

As another example, the server 150 may be configured as a shopping server system that provides a shopping service. The other server 160 associated with the server 150 may function as a product category classifier configured to automatically classify a category of a product being sold through the shopping service provided from the server 150. As another example, the server 150 may be configured to serve as both the shopping server system and also the product category classifier of automatically classifying the category of the product.

Figure 2:
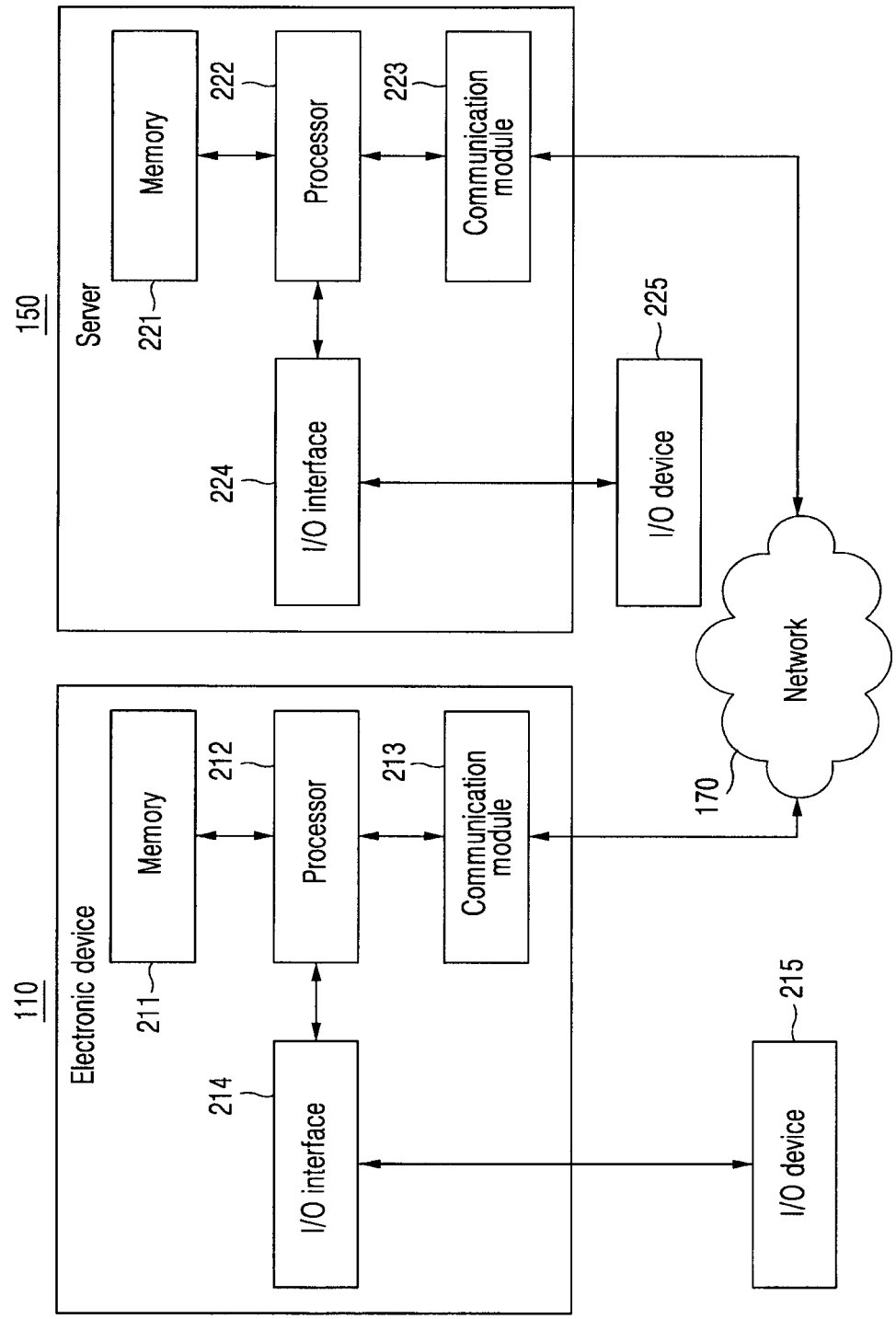
FIG. 2 is a block diagram illustrating an example of a configuration of an electronic device and a server according to one embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211 (221) may include a permanent mass storage device, such as random access memory (RAM), read only memory (ROM), and a disk drive, as a non-transitory computer-readable storage medium. Also, an OS or at least one program code, for example, a code for the application or browser installed and executed on the electronic device 110 (and the server 150), etc., may be stored in the memory 211 (221). Such software components may be loaded from another non-transitory computer-readable storage medium separate from the memory 211 (221) using a drive mechanism. The other non-transitory computer-readable storage medium may include, for example, a floppy drive, a disk, a tape, a DVD/CD-ROM drive, a memory card, etc. According to other example embodiments, software components may be loaded to the memory 211 (221) through the communication module 213 (223), instead of, or in addition to, the non-transitory computer-readable storage medium. For example, at least one program may be loaded to the memory 211 (221) based on a program, for example, the application, installed by files provided over the network 170 from developers or a file distribution system, for example, the server 160, which provides an installation file of the application.

The processor 212 (222) may be configured to process computer-readable instructions of a computer program by performing basic arithmetic operations, logic operations, and I/O operations. The computer-readable instructions may be provided from the memory 211 (221) or the communication module 213 (223) to the processor 212 (222). For example, the processor 212 (222) may be configured to execute received instructions in response to the program code stored in the storage device, such as the memory 211 (222).

The communication modules 213, 223 may provide a function for communication between the electronic device 110 and the server 150 over the network 170, and may provide a function for communication with another electronic device, for example, the electronic device 120 or another server, for example, the server 160. The processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214 (224) may be a device used for interface with an I/O device 215 (225). For example, an input device of the I/O device 215 (225) may include a keyboard, a mouse, etc., and an output device of the I/O device 215 (225) may include a device, such as a display for displaying a communication session of the application. As another example, the I/O interface 214 (224) may be a device for interfacing with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

Also, according to other example embodiments, the electronic device 110 and the server 150 may include a greater or lesser number of components than the number of components shown in FIG. 2. For example, the electronic device 110 may include at least a portion of the I/O device 215, or may further include components such as, for example, a transceiver, a global positioning system (GPS) module, a camera, a variety of sensors, a database, and the like.

Figure 3:
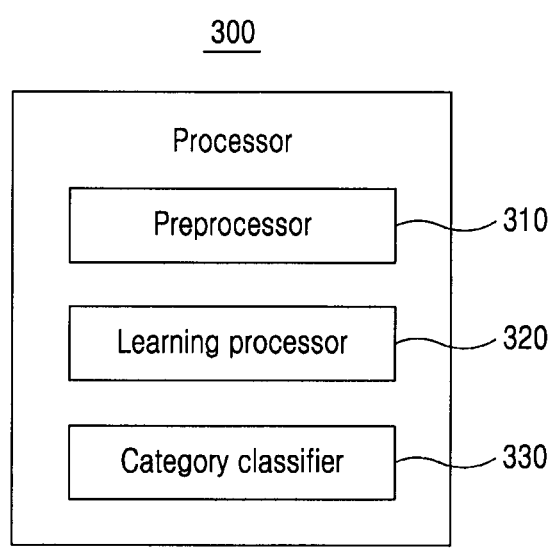
FIG. 3 is a block diagram illustrating an example of components includable in a processor of a server according to one embodiment.
Figure 4:
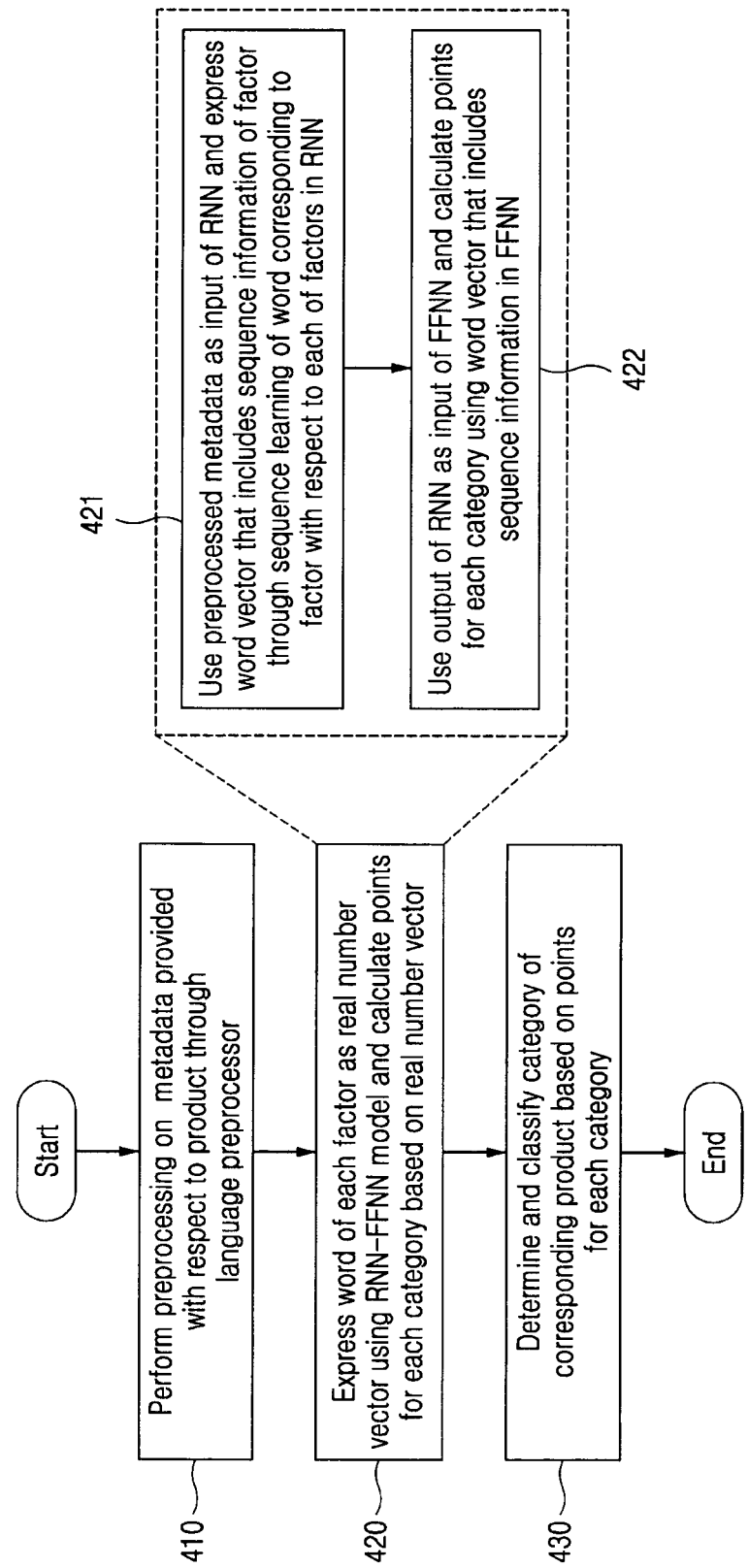
FIG. 4 is a flowchart illustrating an example of a product category classification method performed by a server according to one embodiment.

FIG. 3 is a diagram illustrating an example of components includable in a processor of a server according to at least one example embodiment, and FIG. 4 is a flowchart illustrating an example of a product category classification method performed by a server according to at least one example embodiment. FIG. 3 illustrates components includable in a processor of a single server. Here, the server may correspond to one of the servers 150 and 160 described with FIGS. 1 and 2. Referring to FIG. 3, a processor 300 of the server 150, 160 may include a preprocessor 310, a learning processor 320, and a category classifier 330. These components or units 310, 320, 330 of the processor 300 may control the server 150, 160 to perform operations 410 through 430 included in the product category classification method of FIG. 4, and may be configured to execute at least one program code and an OS included in a memory of the corresponding server to this control. The components or units 310, 320, 330 of the processor 300 may be dedicated portions of the processor for performing their respective functions, or they may be representations of different functions performed by the overall processor 220 in response to control instructions provided from a program code. It is also contemplated that the components or units 310, 320, 330 may be implemented as three individual processors performing their respective functions.

Initially, a technique associated with classifying a category of a product will be described.

(1) Word embedding model refers to a language model that expresses text words as a multi-dimensional real-number and expresses a semantic/structural similarity between words as a distance between two vectors using a neural network model.

(2) Recurrent neural network (RNN) model refers to a neural network model that effectively learns a pattern from data that is sequentially input by correcting a model to enable a recursive input in a hidden layer of a neural network or in which a sequence of features, that is, factors, is used as an input, and considers a temporal aspect.

(3) Feedforward neural network (FFNN) model refers to a typical multi-layer neural network model that is proposed in an early stage of the neural network model and performs learning using only a backpropagation method instead of using a pre-training scheme.

(4) Also, there are models that may automatically classify a product from meta information through a hierarchical classification scheme using a unigram, a support vector machine (SVM), and a k-th nearest neighbor (KNN).

Herein, when meta information expressed by word or symbol values for each product is provided to classify many products, a deep-learning based method is applied as a model of automatically classifying a category of each product. In particular, the example embodiments provide an end-to-end (E2E) product category classification model that may use classification error information of an FFNN for model learning of an RNN by merging at least one RNN and the FFNN among the aforementioned models into a single model.

The product category classification model includes an E2E model that enables word embedding and product category classification from embedded word vectors in a single model by merging the RNN and the FFNN, instead of being separate from the word embedding model that expresses words as a word vector, and a new algorithm for training the E2E model.

For the existing learning of the RNN and the FFNN, the backpropagation based learning algorithm for each model is widely used. However, the learning algorithm proposed herein may transfer category classification error information occurring in the FFNN to the RNN to be used for weight learning of the RNN. Accordingly, a word vector may express word sequence information and information required to further accurately classify a category may be applied.

Herein, it is possible to use a meaning of entire text metadata phrase (sentence) using an RNN suitable for sequence learning. Also, it is possible to enhance the performance by training separate RNNs with respect to various types of factors, such as a product name, large classification/middle classification information, a brand, a shopping mall, and image information. Also, it is possible to easily express a new word using a vector value based on a trained word embedding method.

In operation 410, the preprocessor 310 may perform preprocessing on metadata provided with respect to each product through a language preprocessor. For example, in the case of a product category classification, metadata may include factor information, such as a product name, shopping mall information (ID or a name), brand information (ID or a name), and large classification/middle classification. In the case of a news article section classification, metadata may include a title, a title word sequence placed in reverse order, and a sentence that configures a main text. The preprocessor 310 may filter out meaningless text information from the provided metadata using a language preprocessor, such as a morphological analyzer and an index extractor.

In operation 420, the learning processor 320 may express a word of each of factors constituting metadata as a real-number vector using an RNN-FFNN model in which the RNN and the FFNN are merged into a single model, and may calculate points for each category based on the real-number vector. Here, in operation 421, the learning processor 320 may use the preprocessed metadata as an input of the RNN and thereby express a word vector that includes sequence information of a factor through sequence learning of a word corresponding to the factor with respect to each of the factors in the RNN. In operation 422, the learning processor 320 may use an output of the RNN as an input of the FFNN and thereby calculate points for each category using the word vector that includes sequence information in the FFNN.

In detail, a word of each of the factors constituting metadata of a product may be provided as an input of an RNN for each of the sequentially pre-learned factors. Once a sequential input is completed with respect to the word of each factor, a new output real-number vector value is generated in the RNN and each output factor vector is combined into a single vector. The combined real-number vector is provided as an input of the pre-trained FFNN and points for each category is calculated and output in the FFNN. Accordingly, product meta information may include meaningless or unnecessary noise (for example, words irrelevant to or having low relevance to a product) in category classification. Thus, to further accurately classify a category from the meta information, the learning processor 320 may initially perform sequence learning on the meta information using the RNN so that a word vector may represent word sequence information, and may classify a category of a corresponding product from a word vector that includes sequence information in the FFNN by using a sequence learning result of the RNN as an input of the FFNN.

In operation 430, the category classifier 330 may determine and classify a category of the corresponding product based on points for each category output through the RNN-FFNN model with respect to metadata of the product. For example, the category classifier 330 may set a category having highest points among the points for the respective categories output with respect to the metadata of the product as a category of the corresponding product. As another example, in news section classification, the category classifier 330 may calculate points with respect to detailed sections, such as baseball, soccer, overseas baseball, overseas soccer, congress/party, administration, and national defense/diplomacy, and may set a section having highest points as a corresponding category.

Figure 5:
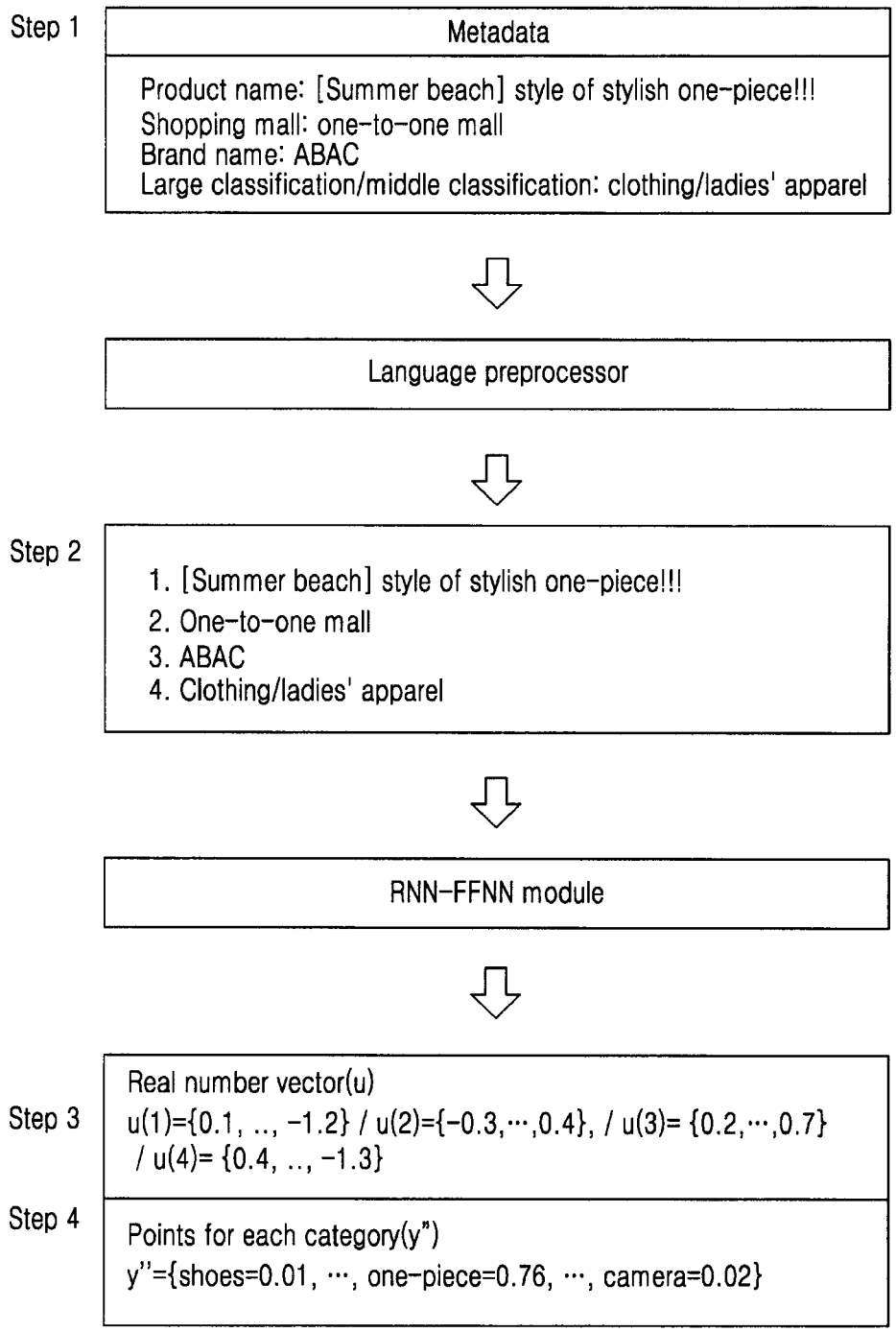
FIG. 5 illustrates an example of a process of automatically classifying a category from metadata of a product according to one embodiment.

FIG. 5 illustrates an example of a process of automatically classifying a category from metadata of a product.

Step 1. Metadata that includes a product name, a shopping mall ID, a brand name, and a large classification/middle classification as factor information is provided.

<Example> Product name (1): [Summer beach] style of stylish one-piece!!!, shopping mall (2): one-to-one mall, brand name (3): ABAC, large classification/middle classification (4): clothing/ladies' apparel Step 2. Preprocessing is performed through a language preprocessor for each piece of factor information of the provided metadata.

<Example> Product name: [Summer beach] style of stylish one-piece!!!, shopping mall: one-to-one mall, brand name: ABAC, large classification/middle classification: clothing/ladies' apparel 1. Summer beach style of stylish one-piece, 2. one-to-one mall, 3. ABAB, 4. clothing ladies' apparel Step 3. Words of the respective factors preprocessed in step 2 are sequentially provided as inputs of the pre-trained RNNs of the respective factors. Once the words of the respective factors are sequentially input to the RNN-FFNN model, a real number vector value (u) for each word is generated and each output factor vector is combined into a single vector.

<Example> 1. Summer beach style of stylish one-piece, 2. one-to-one mall, 3. ABAB, 4. clothing ladies' apparel u(1)={0.1, . . . , −1.2}/u(2)={−0.3, . . . , 0.4}, /u 3)= {0.2, . . . , 0.7}/u(4)={0.4, . . . , −1.3}

Step 4. The real number vector (u) combined in Step 3 is provided as an input of the pre-trained FFNN and points for each category (y″) are calculated as an output of the FFNN.

<Example> 1. Summer beach style of stylish one-piece, 2. one-to-one mall, 3. ABAB, 4. clothing ladies' apparel u(1)={0.1, . . . , −1.2}/u(2)={−0.3, . . . , 0.4}, /u 3)= {0.2, . . . , 0.7}/u(4)={0.4, . . . , −1.3} y″={shoes=0.01, . . . , one-piece=0.76, . . . , camera=0.02}

Figure 6:
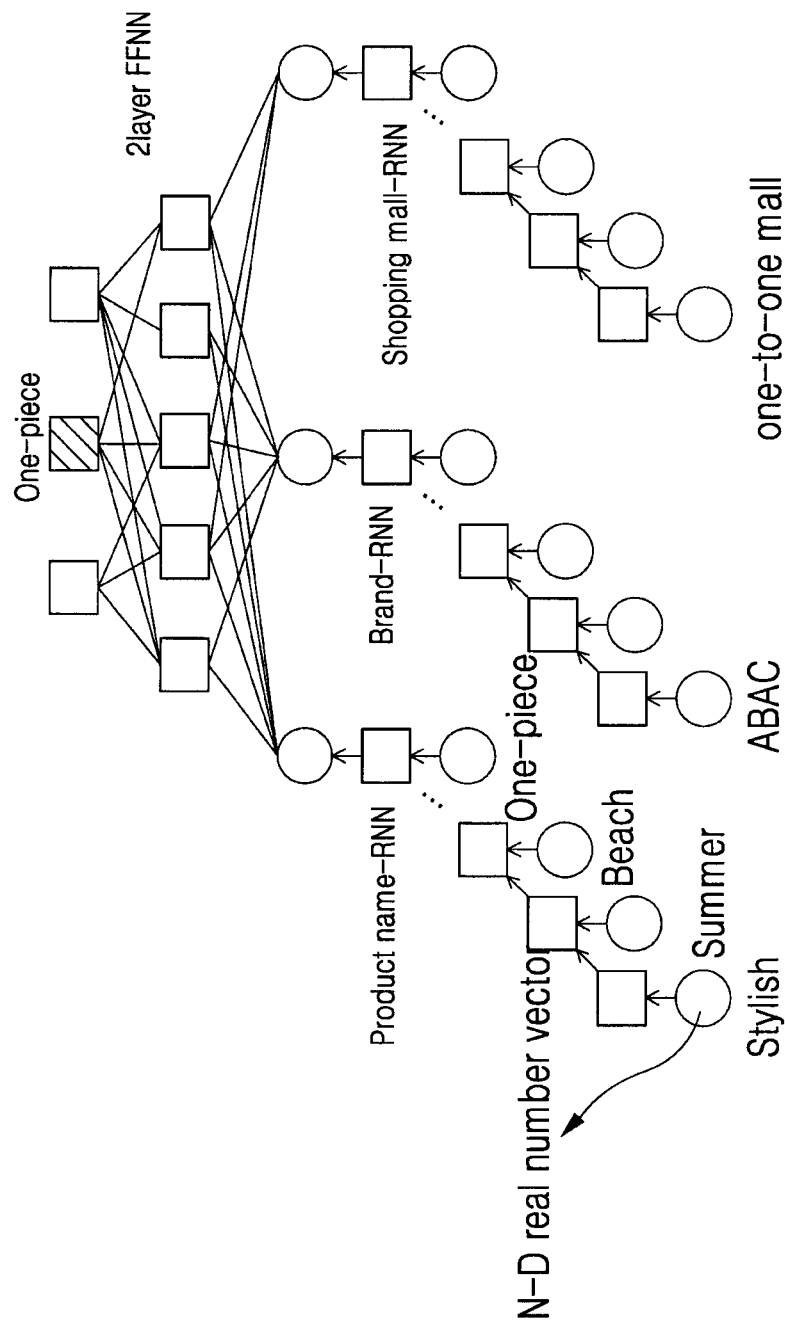
FIG. 6 illustrates a model structure showing an example of metadata according to one embodiment.

FIG. 6 illustrates a model structure of the example of FIG. 5. Referring to FIG. 6, factor-by-factor words of metadata are provided as inputs of RNNs of corresponding factors, for example, product name-RNN, brand-RNN, and shopping mall-RNN, and expressed as real-number vectors. An output factor vector that is an output of each RNN is used as an input of the FFNN and defined as points for each category by the FFNN.

Hereinafter, a product category classification process will be further described. The following methods may be performed by the components of the processor 300 described with FIGS. 3 and 4.

The processor 300 may filter out meaningless text information by applying a language preprocessor, such as a morphological analyzer and an index extractor, to the provided product metadata. For example, the processor 300 may remove a word of an unnecessary part of speech, such as a postposition and an auxiliary verb, or a special symbol such as !, ?, and /, for each factor constituting metadata, and may extract a word corresponding to a substantive or a root of word.

The processor 300 may allocate a separate RNN (product factor-RNN) for learning a sequential data value of each of the factors constituting product metadata, for example, a product name, a brand name, a shopping mall ID, and an image factor. For example, if the factors of the metadata include a product name, a brand name, and a shopping mall, the processor 300 may allocate trained RNNs, that is, product name-RNN, brand name-RNN, and shopping mall name-RNN to the factors, respectively.

With respect to product metadata, parameters such as alphabets, languages, symbols, and unique IDs are not distinguished and are input to a model based on assumption that they are all text words. The input words are expressed as an n-dimensional real-number vector through learning.

When the product metadata is expressed by M types of factors, an mth metadata factor is expressed as X(m)={X(m)1, . . . , X(m)n}. Here, n denotes an integer greater than 0 and may be set as a value, for example, 100, 200, and 300. However, it is provided as an example only and the set number is equal to a number of nodes of a first hidden layer of an RNN.

<Example 1> Shoes→[0.12, −0.81, . . . , 0.43]
<Example 2> 13534→[0.54, . . . , −1.22]

Each product factor-RNN learns a sequence of text words or symbols and outputs a multi-dimensional real-number vector expressing the entire sequence information once the input sequence is terminated. Here, the size of the real number vector to be output may be the same as or different from the size of the real number vector of an input word.

<Example> Boots suiting for beach→RNN→[−1.34, . . . , 0.22]

When the product metadata is expressed by M types of factors, a product category classification model may include M RNNs and a single FFNN, the RNNs are defined as RNN(1), . . . , and RNN(M), respectively, and vectors output from the respective RNNs are defined as u(1)={u(1)1, . . . , u(1)n}, . . . , and u(M)={u(M)1, . . . , u(M)n}, respectively. The output vectors are expressed into a single M×n dimensional vector u={u(1), . . . , u(M)} through combination.

An output vector u generated from an RNN module is provided as an input of the FFNN and an output layer of the FFNN includes a number of output nodes equal to a number of categories included in a product category set.

Provided product meta information x may be defined as points for each category by the RNN-FFNN model. If a number of categories of a product is k, points in a kth category of the product may be defined as $f(y_k|x; \theta)$. A category having the largest points may be set as a category of the product. In the above equation that defines category points, $y_k$ denotes the kth category, x denotes a word vector of metadata, and $\theta$ denotes a model parameter.

A probability such as $P(y_k|x)=g(y_k|x)/(\Sigma_{y \in Y} g(y_k|x))$ may be used as points of a category. Here, Y denotes a set of all product categories and a function $f(y|x)$ may use various functions of which a minimum value is greater than 0, such as an exponential function.

To define an error during a learning process, a product category is defined as a vector of |Y| dimension, such as $y=\{y_1, \ldots, y_{|y|}\}$. For example, if Y={one-piece, shoes, camera}, it may be expressed as category vector y={0, 0, 1} of a camera product. Here, vector values are not limited to 0 and 1, and values different from actual category values may be used. If an actual category vector is y' and a category vector classified by a model is y″, $E=\Sigma N_{n=1} \delta(y', y'')$. Here, N denotes a number of pieces of learning data used for learning and $\delta(y', y'')$ denotes a function indicating a difference between two vectors. Learning is performed so that an error value may be minimized. Various values, such as cross-entropy and Euclidean distance, may be used as the function.

An error value calculated in an output node of the FFNN may be back-propagated downward through a layer and used to calculate a weight matrix of each of the RNNs. Accordingly, training of the RNN and the FFNN may be simultaneously performed.

For example, if Y={one-piece, shoes, camera} and a provided product is shoes, y'={0, 1, 0}. Here, if a model defines a value of a category vector using a probability, y″={0.1, 0.7, 0.2}. If error $\delta(y', y'')=\frac{1}{2}(y'-y'')^2$, an error for each category is expressed by {0.005, 0.045, 0.02}. The error for each category is transferred to an input layer of the FFNN using a backpropagation algorithm of the FFNN that is generally widely used. When the FFNN is assumed as a model that includes a single hidden layer including 10 nodes, error information of a first node of an input layer is $\delta_1=(\Sigma_{k=1}^{10} \delta_1 w_{1k}) h'(net_1)$. Here, $\delta_k$ denotes error information transferred to each node of a layer above the input layer of the FFNN, h' denotes an activation function used for an output layer of an RNN, and h' denotes a differential of the activation function. Various functions having a maximum differential value of 1 or less, such as sigmoid or tan h, may be used for the h function. Also, net1 denotes an output value of a lower layer of the RNN that is input to a first input node and the entire input information of the RNN that includes an output value of a previous time of the same layer. Through this, category error information of the FFNN may be transferred to the RNN.

When it is assumed that the model includes two RNNs, for example, RNN1 and RNN2 and a size of an output word vector of each RNN is 2, a number of input nodes of the FFNN becomes 2×2-4. Among the input nodes of the FFNN, two front nodes correspond to an output node of the RNN1 and two back nodes correspond to an output node of the RNN2. Here, when an input node error information value of the FFNN is {−0.02, 0.03, 0.05, −0.03}, {−0.02, 0.03} is used as an output error information value of a time-based backpropagation algorithm to calculate a weight of each layer, and {0.05, −0.03} is used as an output error information value to calculate weights of the RNN2. The weights of the respective RNNs may be learned from error values transferred to output layer nodes using a generally widely used time-based backpropagation algorithm.

To enhance a performance of learning, each of the RNN and the FFNN may include a plurality of layers. Here, an output value of a lower layer is provided as an input value of an upper layer, nodes constituting adjacent layers are connected in an edge form, and a weight is assigned to each edge. Input data may be divided into subsets based on a performance and efficiency of model training, instead of being provided at a time. Through this, learning of the input data may be performed based on a subset unit.

As described above, there may be provided a model that may simultaneously perform word embedding, item learning, and category classification using the RNN-FFNN model in which the RNN and the FFNN are merged.

Figure 7:
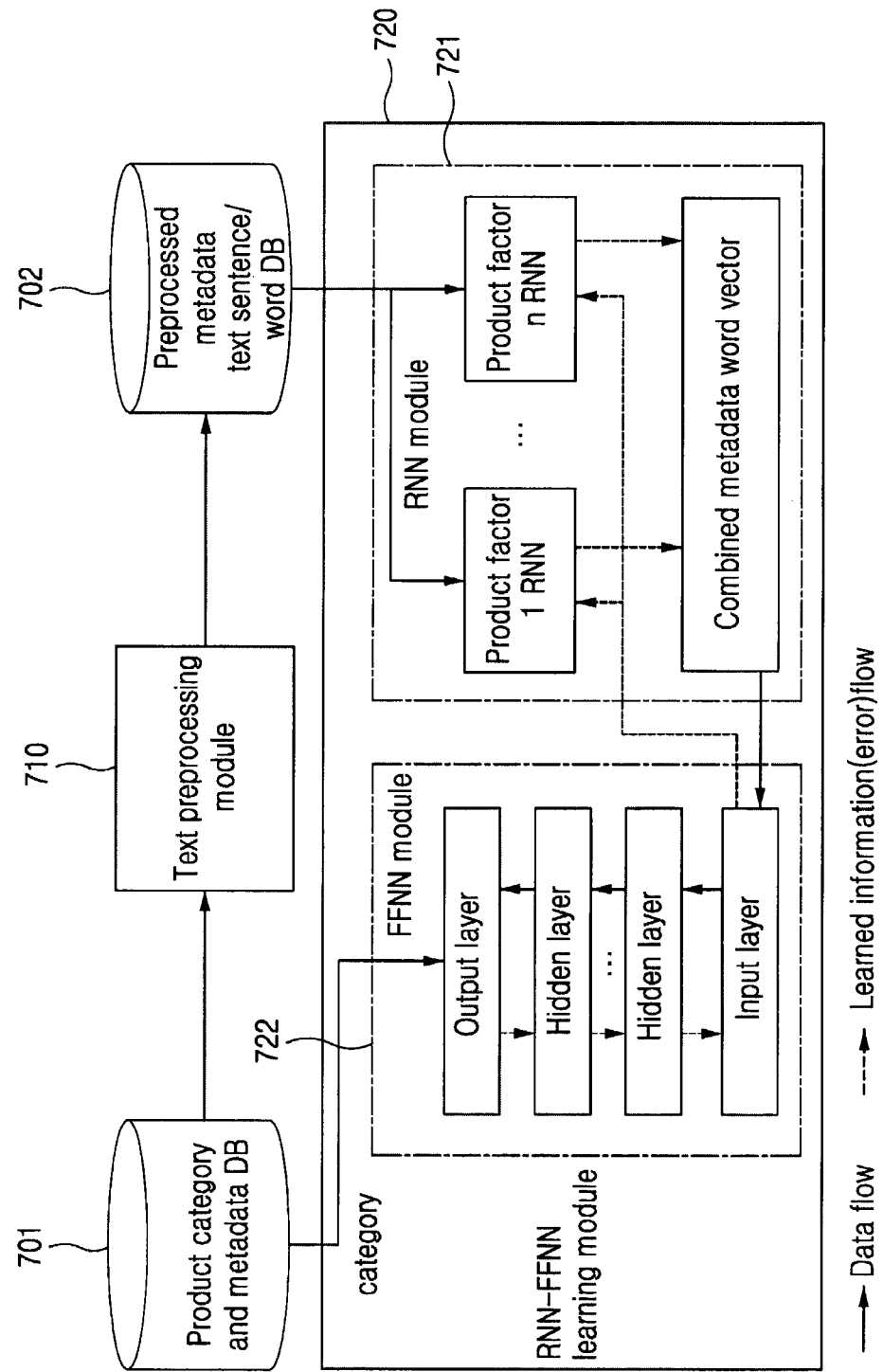
FIG. 7 illustrates a recurrent neural network (RNN)-feedforward neural network (FFNN) learning module for product category classification according to one embodiment.
Figure 8:
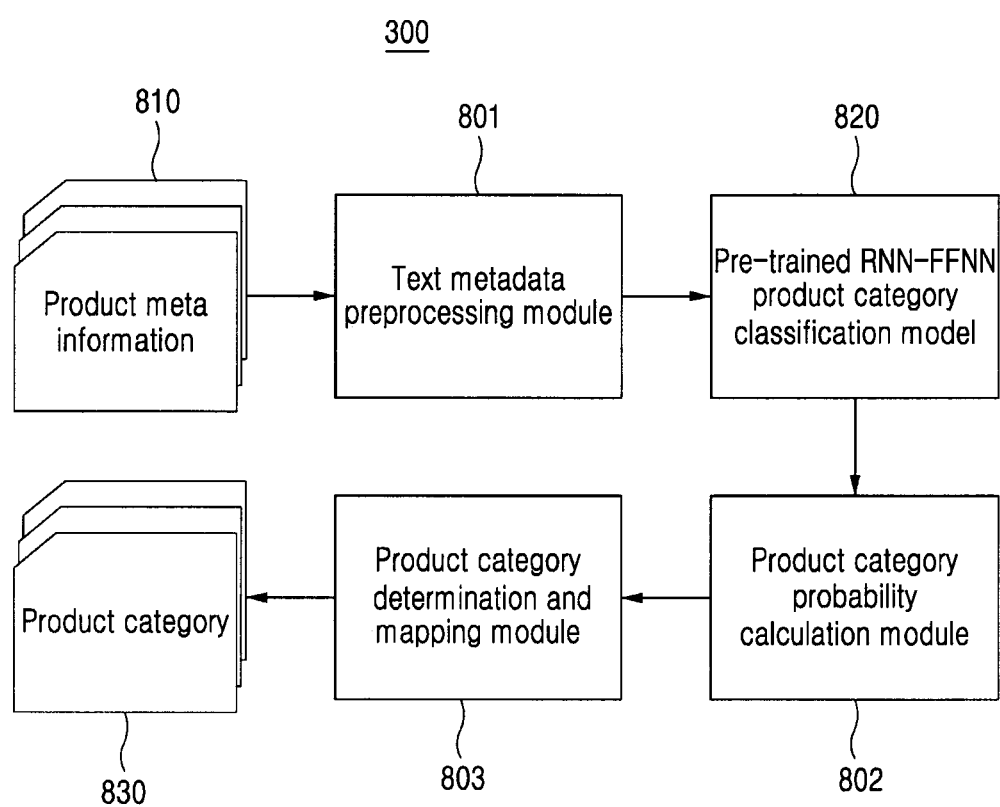
FIG. 8 illustrates a product category classification process using an RNN-FFNN learning model according to one embodiment.

FIG. 7 illustrates an example of the RNN-FFNN learning module and FIG. 8 illustrates an example of a product category classification process using the RNN-FFNN learning module.

FIG. 7 illustrates an example of an RNN-FFNN learning module for product category classification implemented in the processor 300, according to at least one example embodiment.

Referring to FIG. 7, a learning model for product category classification, that is, an RNN-FFNN learning module 720 may be configured by merging an RNN module 721 that is a learning module of an RNN model and an FFNN module 722 that is a learning module of an FFNN model. If metadata of a product is expressed by N factors, the RNN module 721 may include N product factors-RNNs (product factor 1 RNN . . . product factor n RNN) model.

Metadata of a product that is a classification target is provided from a product category and metadata database (DB) 701. Here, meaningless text information, for example, a postposition and an auxiliary verb, may be filtered out from the metadata through a text preprocessing module 710, and the preprocessed metadata may be stored and maintained in a preprocessed metadata text sentence/word DB 702.

The preprocessed metadata may be provided as an input of the RNN module 721. Words of the respective factor of the metadata may be sequentially input to corresponding factor learning RNNs (product factor 1 RNN . . . product factor n RNN). The RNN module 721 converts the words of the respective factors of the metadata to real number vectors and acquires a word vector in which the vectors are combined into a single vector.

The word vector generated from the RNN module 721 is provided as an input of the FFNN module 722. An output layer of the FFNN module 722 may include a number of output nodes corresponding to a number of categories defined in the product category and metadata DB 701. The FFNN module 722 may define the word vector generated for the metadata as points for each category. Here, a category corresponding to largest points may be set as a category of a product.

In particular, category error information generated in the FFNN module 722 may be transferred to the product factor-RNN model of the RNN module 721 through backpropagation using layers, for example, the output layer, a hidden layer, and an input layer, of the FFNN module 722 and used as weight learning of the RNN module 721. That is, classification error information generated in the FFNN module 722 may be transferred to the RNN module 721 and used as an output error information value of a time-based backpropagation algorithm to calculate a weight of each layer of the product factor-RNN. In FIG. 7, an arrow with solid line indicates the direct of data flow between the components of the RNN-FFNN learning module 720, and the arrow with the dashed line indicates the flow of category error formation occurring in FFNN module 722.

FIG. 8 illustrates an example of a product category classification process using an RNN-FFNN learning model according to at least one example embodiment. The category classification process of FIG. 8 may be performed by the components of the processor 300 described with FIGS. 3 and 4.

Referring to FIG. 8, when product meta information 810 is provided, the processor 300 may perform preprocessing on metadata by filtering out meaningless text information using the preprocessor 310, such as a morphological analyzer and an index extractor (Operation 801).

The processor 300 may express a word of each of factors constituting the preprocessed metadata as a real number vector using an RNN-FFNN model 820 in which an RNN and an FFNN are merged, and may calculate a category probability, for example, points for each category, based on the real number vector (Operation 802).

The processor 300 may determine at least one final category, for example, a category 830 corresponding to highest points, with respect to a corresponding product using a result of the RNN-FFNN model 820 for the metadata of the product, that is, the points for each category, and may map the determined final category 830 to the corresponding product information (Operation 803).

According to example embodiments, there is provided a new automatic product category classifier using a deep learning scheme to outperform the performance limit found in an existing automatic product category classifier using a Bayesian network (BN) or a decision tree (DT) scheme. Accordingly, through the enhancement in the performance of automatic product category classification, it is possible to reduce cost used for the category classification and to increase the accuracy of the category classification. In addition, it is possible to enhance a satisfaction level on both a seller that registers a product and a purchaser that searches for and/or purchases a product.

The apparatuses and components described herein may be implemented using hardware components, software components, and/or a combination thereof. For example, the apparatuses and the components described herein may be implemented using one or more computers, such as, for example, a processor, a controller, an arithmetic logic unit (ALU), a digital signal processor, a microcomputer, a field programmable gate array (FPGA), a programmable logic unit (PLU), a microprocessor, or any other processing device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

Software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. Software also may be distributed over network coupled computer systems so that the software is stored and executed in a distributed fashion. Software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. Examples of non-transitory computer-readable media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A product category classification method performed in a server connected to a plurality of user terminals, the method comprising:
    using, as an input to a processor, data expressed by a plurality of factors constituting metadata, and expressing a word vector including sequence information of a factor from the plurality of factors, through a sequence learning of a word corresponding to the factor with respect to each of the factors constituting the data in a first model;
    using, as an input to the processor, an output of the first model, and calculating points for each category for classifying a category of the data using the word vector included in the sequence information of the factor in a second model; and
    determining at least one category for the data based on the points for each category;
    assigning an individual RNN for learning sequential data of a word corresponding to each factor with respect to each of the factors constituting the data; and
    expressing a sequentially input word as a real-number vector and combining the same into a single vector in response to completion of sequential input of the word in the individual RNN assigned to each factor,
    wherein a recurrent neural network (RNN)-feedforward neural network (FFNN) model in which an RNN model that is the first model and an FFNN model that is the second model are merged in a single model is used as a learning model for classifying the category of the data.

2. The method of claim 1, wherein, in the RNN-FFNN model, category classification error information of the FFNN model is transferred to the RNN model and used for learning in the RNN model.

3. The method of claim 2, wherein the FFNN model transfers a difference between a vector value indicating an actual category of the data and a vector value indicating a category corresponding to the word vector to the RNN model as the category classification error information.

4. The method of claim 1, wherein the expressing of the word vector comprises assigning an individual RNN for learning sequential data of a word corresponding to each factor to each of the factors constituting the data.

5. The method of claim 1, wherein the expressing of the word vector comprises outputting a multi-dimensional real-number vector that expresses sequence information of the factor with respect to each of the factors constituting the data in the first model.

6. The method of claim 1, further comprising:
    filtering partial text information included in the data using a language preprocessor.

7. The method of claim 1, wherein the calculating of the points comprises calculating a category probability corresponding to the word vector with respect to a category set associated with the data.

8. A non-transitory computer-readable storage medium storing a program to enable a server connected to a plurality of user terminals to implement a product category classification method, the program providing instructions to the server to execute the steps comprising:
    using, as an input to a processor, data expressed by a plurality of factors constituting metadata, and expressing a word vector including sequence information of a factor from the plurality of factors through a sequence learning of a word corresponding to the factor with respect to each of the factors constituting the data in a first model;

using, as an input to the processor, an output of the first model, and calculating points for each category for classifying a category of the data using the word vector included in the sequence information of the factor in a second model;

determining at least one category for the data based on the points for each category;

assigning an individual RNN for learning sequential data of a word corresponding to each factor with respect to each of the factors constituting the data; and expressing a sequentially input word as a real-number vector and combining the same into a single vector in response to completion of sequential input of the word in the individual RNN assigned to each factor, wherein a recurrent neural network (RNN)-feedforward neural network (FFNN) model in which an RNN model that is the first model and an FFNN model that is the second model are merged in a single model is used as a learning model for classifying the category of the data.

9. A system of a server connected to a plurality of user terminals comprising at least one processor for performing a product category classification method, wherein the at least one processor comprises:

a learning processor configured to provide a learning model for classifying a category of data expressed by a plurality of factors constituting metadata; and a category classifier configured to classify the category of the data based on a learning result of the learning model, wherein the learning processor is configured to:
use the data as an input, and to express a word vector including sequence information of a factor from the plurality of factors through a sequence learning of a word corresponding to the factor with respect to each of the factors constituting the data in a first model, and to use, as an input, an output of the first model, and to calculate points for each category for classifying a category of the data using the word vector included in the sequence information of the factor in a second model, and assign an individual RNN for learning sequential data of a word corresponding to each factor with respect to each of the factors constituting the data, and express a sequentially input word as a real-number vector and combine the same into a single vector in response to completion of sequential input of the word in the individual RNN assigned to each factor, wherein the learning processor is configured to use a recurrent neural network (RNN)-feedforward neural network (FFNN) model in which an RNN model that is the first model and an FFNN model that is the second model are merged in a single model as a learning model for classifying the category of the data; and the category classifier is configured to determine at least one category for the data based on the points for each category.

10. The system of claim 9, wherein, in the RNN-FFNN model, category classification error information of the FFNN model is transferred to the RNN model and used for learning in the RNN model.

11. The system of claim 10, wherein the learning processor is configured to transfer a difference between a vector value indicating an actual category of the data and a vector value indicating a category corresponding to the word vector from the FFNN model to the RNN model as the category classification error information.

12. The system of claim 9, wherein the learning processor is configured to assign an individual RNN for learning sequential data of a word corresponding to each factor to each of the factors constituting the data.

13. The system of claim 9, wherein the learning processor is configured to output a multi-dimensional real-number vector that expresses sequence information of the factor with respect to each of the factors constituting the data in the first model.

14. The system of claim 9, wherein the at least one processor further comprises:

a preprocessor configured to filter partial text information included in the data using a language preprocessor.

15. The system of claim 9, wherein the learning processor is configured to calculate a category probability corresponding to the word vector with respect to a category set associated with the data.

* * * * *